United States Patent Office 3,365,321
Patented Jan. 23, 1968

3,365,321
METHOD OF DECORATING A PLASTIC ARTICLE UTILIZING RESIST AND DECORATIVE LAYERS PORTIONS OF WHICH ARE REMOVED BY AN ADHESIVE FILM
Norwood A. Adler, Oakland City, Ind., assignor to Kent Plastics Corporation, Evansville, Ind., a corporation of Indiana
No Drawing. Filed Oct. 25, 1963, Ser. No. 318,811
5 Claims. (Cl. 117—5.5)

This invention relates to a new and improved method of decorating surfaces and articles and to the articles so produced. More particularly, the invention relates to a novel method of decorating plastic articles which are coated over substantially an entire surface except for special portions such as numerals, letters, etc. and to the resulting decorated articles.

Heretofore, coated articles with uncoated numerals, etc. have been made by coating the entire article and thereafter removing the coating or coatings from the portions which are to be uncoated by grinding, sanding or similar operations. Such methods not only have been costly and cumbersome, but also the portions from which the coating is removed are not aesthetically pleasing due to the dullness and/or grinding marks remaining after the removal of the coating.

In view of the above and other difficulties and shortcomings of the methods heretofore employed, it was totally unexpected and surprising to discover a method which overcomes the problems of previously employed methods and, in addition, provides advantages and benefits heretofore unattainable. For example, the method of the invention is simple and convenient and does not require grinding or sanding operations. In addition, the uncoated surfaces of articles made according to the invention are smooth and clear with sharp uniform edges.

The method of the present invention comprises the steps of forming a resist layer on portions of a surface which are to be uncoated in the final product, applying one or more coatings to the surface, contacting the portions of the surface which are to be uncoated with a tacky or adhesive film, and removing the coating from the portions to be uncoated.

The resist layer formed initially on portions of the surface to be uncoated advantageously is a wax type coating, for example, a low molecular weight polymer such as a polyethylene or polytetrafluoroethylene wax or mixtures of such polymers. Preferably, the layer is formed on the surface at an elevated temperature so that the wax has sufficient mobility to completely cover the desired portions of the article. Advantageously, the resist layer is formed by employing a tape which has a resist layer thereon. Preferably, the layer may be formed by hot stamping a tape against the surface to transfer the resist layer onto the desired portions of the surface.

The desired paints, coatings, plates, etc. may be applied to the surface of the article after the resist layer has been formed on portions of the surface thereof. For example, one or more coatings may be sprayed over the face surface of the article and/or the article may be vacuum metallized to form a plate on the surface.

After the coating operations have been completed, a tacky or adhesive film is placed into contact with the surface of the article. The tackiness or adhesiveness of the film advantageously is achieved by heating the film to at least about its softening point. Thus, when the film contacts the surface of the article it tightly adheres to the paints, coatings, metals, etc. which previously have been applied to the article. Separating the film from contact with the surface removes the portions of the coatings applied to the resist layer leaving the article coated over substantially an entire surface with the exception of the portions on which the resist layer originally was formed.

The film employed to remove the paints, etc. from the surface advantageously becomes tacky and adhesive on heating to about its softening point. Preferably, a low molecular weight polymer is employed which softens at a temperature in the range of about 250° to 300° F., for example, a polymer such as a low molecular weight acrylic ester polymer. Advantageously, the film is carried on a high strength base such as a polyester tape. To achieve maximum adhesion between the polyester tape and the polymer film, it is desirable to employ an intermediate metal layer between the base and the film such as a metallized aluminum coating.

The following example illustrates one embodiment of the present invention and is not intended to restrict the scope of the invention. In the example, parts and percent are by weight.

*Example*

A translucent plastic part having raised numerals for use as an automobile speedometer dial was contacted with a polyester tape coated with a formulation comprising about 40% of a polyethylene wax having a molecular weight of approximately 1500 sold by Eastman Kodak Company as Epolene 11–N and about 60% of a tetrafluoroethylene polymer having a molecular weight of about 3000 sold by E. I. du Pont de Nemours & Company as Vydax AR. The polymer mixture applied to the tape was formed by dissolved Epolene 11–N in perchloroethylene at a temperature of about 150° F. and adding Vydax AR to the solution at a temperature of about 95°–100° F. with agitation.

As the polymer coated face of the tape contacted the raised surfaces of the part, a heated block was pressed against the opposite side of the tape causing a portion of the polymer mixture to transfer to the raised surfaces. The part was then sprayed over its entire face with a base paint and thereafter vacuum metallized to form an aluminum metal coating over the surface. A transparent protective coating was sprayed onto the metallized surface.

A second tape having a film thereon of an acrylic ester polymer (molecular weight approximately 400,000) sold by Rohm & Haas Company as Acryloid B–7 was placed against the raised surfaces of the part with the polymer film next to the part. At the same time, a heated block was pressed against the tape to heat the polymer film to a temperature of about 280° F. which rendered the film adhesive. The tape was then pulled away from the plastic part causing the coatings on the resist coated raised surfaces of the part to separate from the part and adhere to the tape.

A number of parts coated according to the above method were carefully examined, and it was found that the raised numeral surfaces were clear and smooth with sharp edges.

The above description shows that the present invention provides a new and improved method of decorating surfaces which are coated over substantially an entire surface except for special portions such as numerals, letters, etc. Moreover, the method of the invention is simple and convenient and does not require grinding or sanding operations to complete the decoration of the article. Furthermore, the uncoated surfaces of articles made according to the method of the invention are clean and smooth and have sharp uniform edges.

It will be apparent from the above discussion that various modifications in the specific procedures described herein may be made within the scope of the invention. Therefore, the invention is not intended to be limited to the particular procedures described in detail except as may be required by the following claims.

What is claimed is:

1. A method of decorating a plastic article, comprising: forming a resist layer on predetermined portions of the plastic article to be decorated; applying at least one coating to said plastic article after said resist layer has been formed on said predetermined portions thereof; contacting at least that portion of said coating on said resist layer with a film heated to about its softening point and which adheres more tenaciously to said coating than does said coating to said surface through said resist layer; and thereafter removing said film to thereby remove said coating from said predetermined portions.

2. The method of claim 1 wherein said film is a polymer film on a supporting base which when heated to about its softening point adheres more tenaciously to said coating than does said coating to said surface through said resist layer.

3. The method of claim 1 wherein said film is a low molecular weight acrylic ester polymer on a supporting base which when heated to about its softening point adheres more tenaciously to said coating than does said coating to said surface through said resist layer.

4. A method of decorating a plastic article, comprising: hot stamping a resist layer on predetermined portions of the plastic article to be decorated; applying at least one decorative coating to said plastic article after said resist layer has been hot stamped on said predetermined portions thereof; hot stamping at least that portion of said coating on said resist layer with a film on a supporting base while said film is rendered adhesive by heating said film to about its softening point with said film adhering more tenaciously to said coating than does said coating to said surface through said resist layer; and thereafter removing said film to thereby remove said coating from said predetermined portions.

5. The method of claim 4 wherein said resist layer is hot stamped from a coated tape, wherein said film is on a supporting tape, and wherein said film is removed by separating the supporting tape from the article to thereby remove the coating from said predetermined portions.

References Cited

UNITED STATES PATENTS

| | | | |
|---|---|---|---|
| 374,559 | 12/1887 | Rudolph | 117—8 |
| 1,225,735 | 5/1917 | MacLaurin | 117—6 |
| 1,304,749 | 5/1919 | Divine | 117—5.5 |
| 1,829,562 | 10/1931 | Kohlwey | 117—3.2 X |
| 1,899,971 | 3/1933 | Meehan | 117—8 |
| 1,915,642 | 6/1933 | Arbuckle et al. | 117—5.5 |
| 2,078,448 | 4/1937 | Turner | 101—43 |
| 2,169,062 | 8/1939 | Way | 117—38 X |
| 2,559,389 | 7/1951 | Beeber et al. | 117—38 X |
| 2,602,025 | 7/1952 | De Goeiji et al. | 117—5.5 |
| 2,628,178 | 2/1953 | Burnett et al. | 154—43 |
| 2,807,111 | 9/1957 | Turner | 117—5.5 X |
| 2,819,196 | 1/1958 | Munro | 156—254 |
| 3,104,979 | 9/1963 | Lawton et al. | 106—178 |
| 3,127,300 | 3/1964 | Maggio | 159—32 |
| 3,131,077 | 7/1964 | Barnby et al. | 117—5.5 |
| 3,142,431 | 7/1964 | Noble | 229—23 |

OTHER REFERENCES

Clogg, Robert W., Mod. Plastics, "High Speed Masking Process," October 1958, pages 123–124.

WILLIAM D. MARTIN, *Primary Examiner.*

W. D. HERRICK, *Assistant Examiner.*

Dedication 3,365,321.—*Norwood A. Adler*, Oakland City, Ind. METHOD OF DECORATING A PLASTIC ARTICLE UTILIZING RESIST AND DECORATIVE LAYERS, PORTIONS OF WHICH ARE REMOVED BY AN ADHESIVE FILM. Patent dated Jan. 23, 1968. Dedication filed Dec. 19, 1968, by the assignee, *Kent Plastics Corporation*.

Hereby dedicates to the Public the entire term of said patent.

[*Official Gazette April 29, 1969.*]